United States Patent
Ruberg et al.

(10) Patent No.: US 7,085,805 B1
(45) Date of Patent: Aug. 1, 2006

(54) REMOTE DEVICE MANAGEMENT IN GROUPED SERVER ENVIRONMENT

(75) Inventors: Alan T. Ruberg, Foster City, CA (US); James G. Hanko, Redwood City, CA (US); Manpop A. Lau, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 614 days.

(21) Appl. No.: 09/612,141

(22) Filed: Jul. 7, 2000

(51) Int. Cl.
*G06F 15/16* (2006.01)
*G06F 9/44* (2006.01)

(52) U.S. Cl. ................................................. 709/203
(58) Field of Classification Search ........ 709/201–253; 714/1–57, 699–824; 725/1–153
See application file for complete search history.

(56) References Cited

U.S. PATENT DOCUMENTS

| | | | | |
|---|---|---|---|---|
| 5,794,038 A | * | 8/1998 | Stutz et al. ................. | 709/315 |
| 6,272,545 B1 | * | 8/2001 | Flanagin et al. ............ | 709/228 |
| 6,389,589 B1 | * | 5/2002 | Mishra et al. .............. | 717/170 |
| 6,460,082 B1 | * | 10/2002 | Lumelsky et al. .......... | 709/226 |
| 6,477,568 B1 | * | 11/2002 | Borrett et al. .............. | 709/223 |
| 6,480,901 B1 | * | 11/2002 | Weber et al. ............... | 709/246 |
| 6,490,616 B1 | * | 12/2002 | Maryka et al. ............. | 709/222 |
| 6,549,934 B1 | * | 4/2003 | Peterson et al. ............ | 709/203 |
| 6,553,408 B1 | * | 4/2003 | Merrell et al. ............. | 709/213 |
| 6,591,290 B1 | * | 7/2003 | Clarisse et al. ............ | 709/205 |
| 6,628,415 B1 | * | 9/2003 | Lawrence et al. ......... | 358/1.15 |

* cited by examiner

*Primary Examiner*—David Wiley
*Assistant Examiner*—Arrienne M. Lezak
(74) *Attorney, Agent, or Firm*—Martine Penilla & Gencarella, LLP (57) ABSTRACT

Methods and apparatus for data distribution among servers in a grouped server system. Each server in the group includes a device manager which is responsible for brokering devices to services. A service communicates to a device manager on the same server through an inter-process communication mechanism. A desktop unit, having persistent connections with a single device manager, switches to a peer (other device managers in the group) when the desktop unit is reset or when a device manager fails. At least one device is connected to the desktop unit. When the desktop unit is connected to the new device manager, ownership of the devices may change. The new device manager notifies its peers of any device status changes.

9 Claims, 10 Drawing Sheets

REMOTE DEVICE MANAGEMENT IN GROUPED SERVER ENVIRONMENT

FIELD OF THE INVENTION

This invention relates to computer systems, more specifically, to managing remote devices in a grouped server environment.

Sun, Sun Microsystems, Sun Ray, Sun logo, Java, and all Java-based trademarks and logos are trademarks or registered trademarks of Sun Microsystems, Inc. in the United States an other countries. All SPARC trademarks are used under license and are trademarks of SPARC International, Inc. in the United States and other countries. Products bearing SPARC trademarks are based upon an architecture developed by Sun Microsystems, Inc.

BACKGROUND OF THE INVENTION

Computer systems often include additional devices used to provide additional functionality. These devices, often called "peripheral" devices, may include keyboards, printers, scanners, network interface and graphics cards, modems, monitors, cameras, sound input devices, and the like. Generally, device drivers (software programs that convert the more general input/output instructions of the operating system into messages that the devices can understand) control the peripheral devices. Many device drivers are built into the operating system of the computer and device drivers that are not already in the operating system typically need to be added.

In some network environments, peripheral devices may not be coupled directly to the computer system through an expansion bus (e.g., Industry Standard Architecture (ISA), Peripheral Component Interconnect (PCI), S-Bus, VersaModule Eurocard (VME) bus), but rather through a network connection, via a so-called "thin" or "ultra-thin" client. In a thin or ultra-thin-client environment, it may not be possible to embed device-specific code, such as device drivers, for the large number of devices available.

In addition, in some network environments (e.g., a thin-client architecture), data and computational functionality are provided by data sources via a centralized processing arrangement. In this arrangement, all computing is performed by one or more servers acting as the central data sources independently of the destination of the data being generated. These servers may constitute a single point of failure for a potentially large pool of users and thereby jeopardizing system reliability and performance.

Grouping addresses the problem of single point failure by enabling multiple servers to share management of a set of appliances (or devices). In other words, if one server in the group fails, functions performed by the failed server may be redistributed to the other servers in the system. To distribute load across multiple servers and for re-distribution after a server failure, all devices should be equally accessible to every server. In addition, consistency should be maintained when servers fail, meaning that a failed server should not affect programs that are running on other servers nor should the failed server affect devices that are in use. In general, uninterrupted operation of the devices should be maintained.

Connecting devices to applications in a grouped server system may be challenging because an individual device may be managed (e.g., identified, made available, protected) by a different server. For example, using a broadcast-based shared database for device location service fails to consistently propagate information (e.g., device availability, allocation, and removal) with low latency (e.g., <1 second). In a broadcast system, each server has a mirror of the shared databases which are often lazily updated (e.g., several mods per day rather than several mods per minute). Multiple servers are used only during transition states.

Another scheme for device location services is a database which is shared among all the servers wanting to locate services. This type of database handles transactions relatively quickly, but pose a single point of failure.

Yet another scheme for device location services is a distributed, replicated database that has low-latency transaction ability and does not pose a single point of failure. However, a distributed, replicated database is difficult to construct and involves high synchronization overhead.

SUMMARY OF THE INVENTION

The invention relates to methods and apparatus for data distribution among servers in a grouped server system where device operations remain uninterrupted when a server fails. Servers in the grouped server system do not pose a single point of failure and implementation is relatively simple.

In accordance with the invention, a plurality of servers operate as a group. Each server in the group includes a device manager which is responsible for brokering devices to services. A service communicates to a device manager on the same server through an inter-process communication mechanism. A desktop unit coupled to a server maintains persistent connections with a single device manager. When the desktop unit is reset or when a device manager the desktop unit is connected to fails, the desktop unit switches to a peer (other device managers in the group) or reconnects with the same device manager if the device manager recovers prior to establishing a new connection with a peer. When the desktop unit is connected to the new device manager, ownership of the devices coupled to the desktop may change. The new device manager notifies its peers of any new ownership.

In one embodiment, each server in the group includes a device manager which maintains a device list. The device list may include devices the device manager manages and optionally, devices its peers manage. When a service is initiated, the service creates a finder which includes device capabilities the service desires. The service issues a command to its local device manager to locate a device that matches the finder. The local device manager searches its device list for a device that matches the finder. If a match is found, the device manager informs the service. If a match is not found, the device manager forwards the finder to a peer. The peer then compares the finder with its device list and informs the service if a match has been found. After a match is located, the device service requests allocation of the device. If the device is available, the device may be allocated. The device manager managing the device then updates its device list, and informs its peers.

In one embodiment, if a device changes state (e.g., powered-off, connected, disconnected, owned), a device record is reported by the desktop unit to its service and its device manager. The device manager updates its device list and searches for a device that matches the finder. If no matches are found, the device manager forwards the finder to a peer.

In one embodiment, messages reporting ownership are time-stamped upon generating of the messages.

This summary is not intended to limit the scope of the invention, which is defined solely by the claims attached hereto.

BRIEF DESCRIPTION OF THE DRAWINGS

FIG. 7 (including FIG. 7A and FIG. 7B) shows a flowchart illustrating device manager operation in a grouped server environment in accordance with one embodiment of the present invention.

While specific embodiments are described and illustrated herein, these embodiments are not intended to limit the scope of the invention, which is susceptible to various modifications and alternative forms.

DETAILED DESCRIPTION OF THE INVENTION

Methods and apparatus for data distribution among servers in a grouped server system are provided. One or more embodiments of the invention may be implemented as computer software in the form of computer readable code executed on a general purpose computer or in the form of bytecode class files executable within a Java™ runtime environment running on such a computer, or in the form of bytecodes running on a processor (or devices enabled to process bytecodes) exiting in a distributed environment (e.g., one or more processor on a network). In general, any suitable computer system and programming/processing environment may be used.

Figure 1:
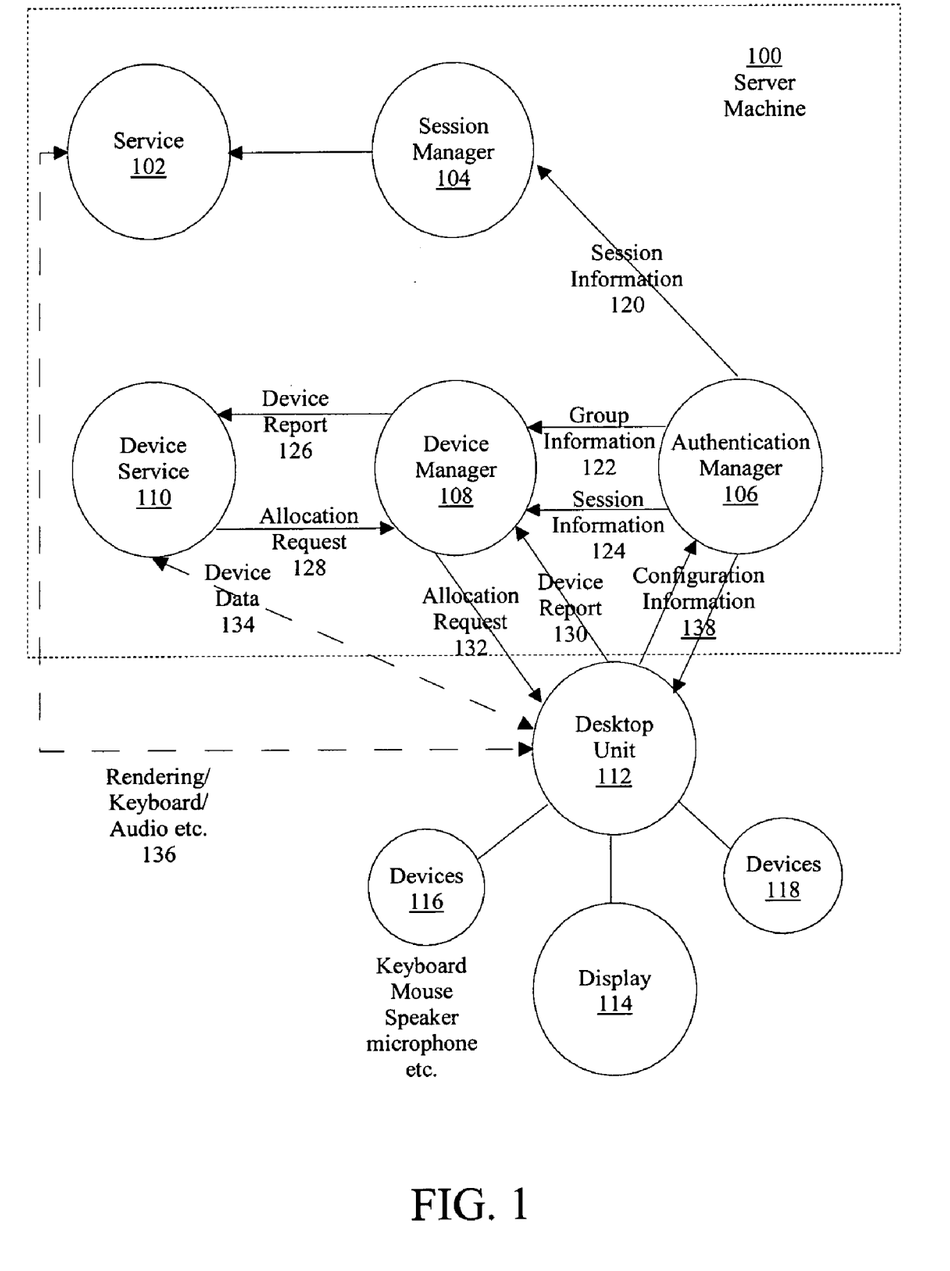
FIG. 1 is a conceptual illustration of a computer architecture for a server machine in relation to a desktop unit.

FIG. 1 is a conceptual illustration of a computer architecture for a server machine 100 in relation to a desktop unit 112. Server machine 100 may be a consolidated client machine or any machine that manages or delegates resources for a desktop unit (e.g., desktop unit 112). In general, server machine 100 may be any suitable machine that runs a device manager which communicates with a desktop unit (DTU). For example, server machine 100 may be a general purpose computer or a Sun Ray™ server manufactured by Sun Microsystems, Inc.

Figure 2:
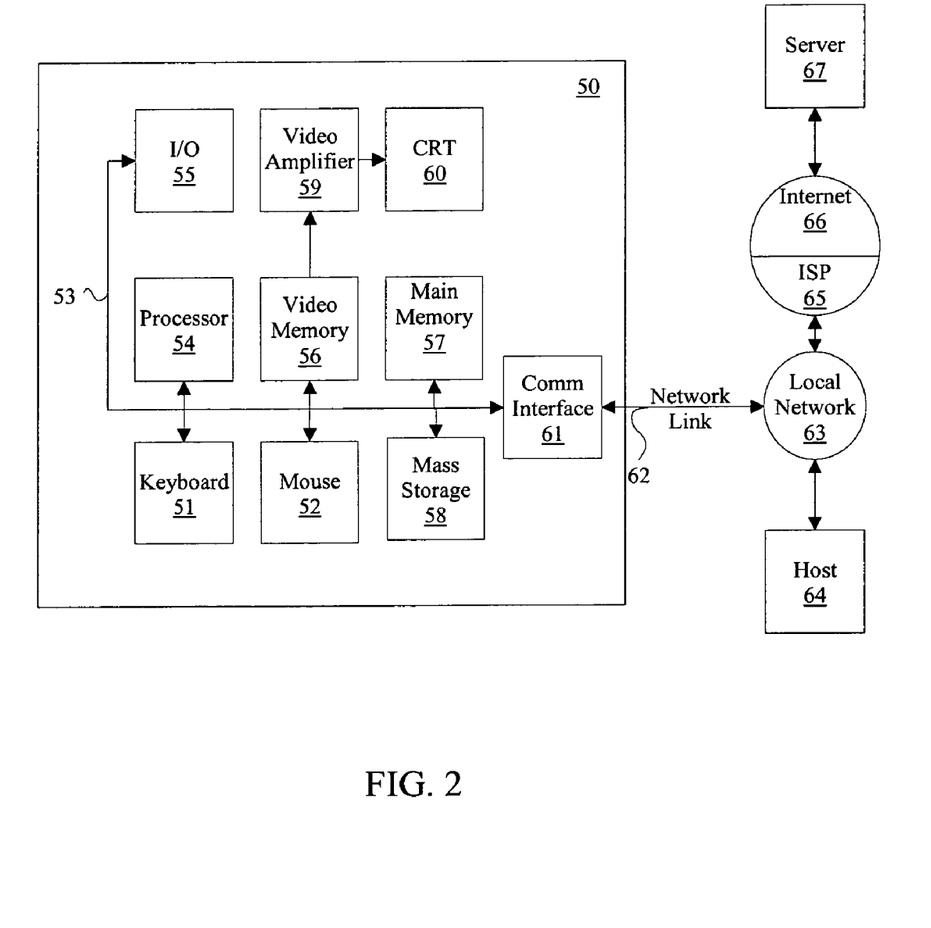
FIG. 2 illustrates a block diagram of a general purpose computer.

FIG. 2 shows a block diagram of a general purpose computer 50 which may be used to implement server machine 100 shown in FIG. 1. A keyboard 51 and mouse 52 are coupled to a bidirectional system bus 53. Keyboard 51 and mouse 52 introduce user input to computer system 50 and communicate user input to a central processing unit (CPU) 54. Other suitable input devices may be used in addition to, or in place of, mouse 52 and keyboard 51. Input/Output (I/O) unit 55 coupled to bi-directional system bus 53 represents I/O elements such as a printer, audio/video I/O, etc.

Bi-directional system bus 53 may contain, for example, thirty-two address lines for addressing a video memory 56 or a main memory 57. System bus 53 may also includes, for example, a 32-bit data bus for transferring data between and among the components such as CPU 54, main memory 57, video memory 56 and mass storage 58, all coupled to system bus 53. Alternatively, multiplex data/address lines may be used instead of separate data and address lines.

CPU 54 may be a microprocessor manufactured by Motorola (e.g., 680X0 processor), a microprocessor manufactured by Intel (e.g., 80X86 or Pentium processor) or a SPARC™ microprocessor from Sun Microsystems, Inc. Other suitable microprocessor or microcomputer may be utilized.

Main memory 57 may comprise dynamic random access memory (DRAM). Video memory 56 may be a dual-ported video random access memory. One port of video memory 56 may be coupled to a video amplifier 59 which is used to drive a monitor 60. Monitor 60 may be a cathode ray tube (CRT) raster monitor, a liquid crystal display (LCD), or any suitable monitors for displaying graphic images. Video amplifier 59 is well known in the art and may be implemented by any suitable apparatus. Pixel data stored in video memory 56 may be converted to a raster signal suitable for use by monitor 60. Mass storage 58 may include both fixed and removable media, such as magnetic, optical or magnetic optical storage systems or any other available mass storage technology.

Computer 50 may include a communication interface 61 coupled to bi-directional system bus 53. Communication interface 61 provides a two-way data communication via a network link 62 to a local network 63. For example, if communication interface 61 is an integrated service digital network (ISDN) card or a modem, communication interface 61 provides a data communication connection to the corresponding type of telephone line, which comprises part of network link 62. If communication interface 61 is a local area network (LAN) card, communication interface 61 provides a data communication connection via network link 62 to a compatible LAN. Wireless links are also possible. In any such implementation, communication interface 61 sends and receives electrical, electromagnetic or optical signals which carry digital data streams representing various types of information.

Network link 62 typically provides data communication through one or more networks to other data devices. For example, network link 62 may provide a connection through local network 63 to host computer 64 or to data equipment operated by an Internet Service Provider (ISP) 65. ISP 65 in turn provides data communication services through the world wide packet data communication network commonly referred to as the "internet" 66. Local network 53 and internet 66 both use electrical, electromagnetic, or optical signals which carry digital data streams. The signals through the various networks and the signals on network link 62 and through communication interface 61, which carry the digital data to and from computer 50, are exemplary forms of carrier waves transporting the information. Computer 50 can send messages and receive data, including program code, through these communication channels. In the Internet example, server 67 might transmit a requested code for an application program through internet 66, ISP 65, local network 63 and communication interface 61. The received code may be executed by CPU 54 as it is received, and/or stored in mass storage 58, or other non-volatile storage for later execution. In this manner, computer 50 may obtain application code in the form of a carrier wave.

Referring back to FIG. 1, desktop unit 112 may be any suitable computer system, including a general purpose computer, a client-server system, a network computer, or a human interface device (HID) system. For example, desktop unit 112 may be a workstation from Sun Microsystems, Inc., IBM Corporation, Hewlett Packard, Digital or other manufacturers. In general, desktop unit 112 may be any system that allows others (e.g., device managers on a network) to control devices that are attached to it.

Desktop units typically have devices attached to them. For example, display 114, devices 116, and devices 118 may be attached to desktop unit 112. Display 114 may be any suitable monitor or display for displaying graphic images. Device 116 may be devices that are supported by desktop unit 112. For example, devices 116 may be a keyboard, mouse or microphone that uses device protocols already in desktop unit 112. Device 118 may be devices that do not fit into the rendering protocol and that cannot be handled by the device drivers that are already in desktop unit 112. For example, devices 118 may be a printer, disk driver, touch screen, etc. Devices 118 are devices typically managed remotely through device managers.

Devices 116 and devices 118 may include multi-function devices, e.g., devices that perform multiple functions such as a device that can perform printing, faxing and copying or a device that can perform display and audio functions. Multi-function devices may be broken up into subparts called units. Units may be individually allocatable. For example, a printer/fax machine/copy machine may be broken into a print unit, a fax unit and a copy unit and each unit may perform a different service.

Various components of server machine 100 are now described. Server machine 100 may include an authentication manager 106 which maintains connections with desktop unit 112 to authenticate users (to determine policy). Configuration information 138 may be passed between authentication manager 106 and desktop unit 112. Authentication manager 106 is generally aware of which user is requesting access and which session (a persistent representation of a related set of one or more services executing on behalf of a user) to associate with that user. Authentication manager 106 informs session manager 104 of session information 120 so that session manager 104 is aware of which service is associated with which particular session. Session manager 104 also manages a connection between service 102 and desktop unit 112.

Service 102 generally provides output data and responds to user requests and inputs. For example, service 102 may provide e.g., computation, state, and data, to devices attached to desktop unit 112. Service 102 is typically under the control of a common authority or manager called a service manager (not shown). Services may be Sun Ray™-aware device drivers that wish access to devices attached to an HID. Services may also be Java™ program execution services, X11/Unix services, archived video services, Windows NT services or other suitable services.

Service 102 communicates with local devices (e.g., devices 116 and 118) that are connected to desktop unit 112. The communication may involve taking outputs from computational services and converting them into standard protocols for the associated devices. This data protocol conversion may be performed by, e.g., a middleware layer, such as an X11 server, the Microsoft Windows interface, a video format transcoder, the OpenGL interface, or a variant of the java.awt.graphics class within the service producer machine. Service 102 renders data such as keyboard and audio data 136 to desktop unit 112.

Authentication manager 106 also transfers group information 122 and session information 124 to a device manager 108. Device manager 108 performs basic resource management function and communicates between authentication manager 106 and a device service 110. Device manager 108 uses the association between the user, session and desktop unit to map device service 110 to a particular device connected to desktop unit 112. Device manager 108 should be flexible enough to handle a wide variety of session and service scenarios.

Device service 110 is the client to device management (e.g., device manager 108) and may be created by an external party such as a user, a system administrative module, an application or a function performed on behalf of an application. Device service 110 controls a device by implementing a complete device driver for the device. As such, device service 110 is responsible for creating device requests (e.g., allocation request 128). Device service 110 can also directly control the devices (e.g., devices 116 and/or 118, display 114) through the desktop unit 112.

Typically, device service 110 uses remote bus proxy to help structure itself with respect to a session and handling the device protocol. There may be one device service for each device or for each user; one device service for each type of device; one device service for each user and type of device; and so on. Logical functions performed by device service 110 and service 102 with relation to the user may be the same (act on the user's behalf to perform similar functions) and are typically distinguished by which manager (e.g., device manager vs. session manager) they are connected to.

As described above, a thin-client may not have built-in knowledge on how to directly control the devices that are directly attached to it. In accordance with the present invention, device manager 108 performs the tasks of, e.g., approving services, keeping an inventory of devices, and locating devices on the interconnect. Device management can take several forms, for example, a global device service (such as a Solaris™ nexus driver), a per-device driver, or a per-class driver. Device management may also involve different scopes such as interconnect scope, desktop scope, and session scope. In general, device managers broker devices that are attached to desktop units on the interconnection fabric so that devices may be remotely accessed from various services.

It is noted that without device manager 108, device service 110 and authentication manager 106 are incapable of communicating with each other. However, authentication manager 106 and device service 110 do not depend on device manager 108 to perform their functions.

DTUs are the real owner of the devices that are attached to it (e.g., desktop unit 112 is the owner of display 114, devices 116 and devices 118). The DTUs announces the presence and removal of devices and controls when a particular device should be allocated or released. However, owning the device typically enables setting-up the device and setting global parameters of the devices but does not allow use of the devices. To actually use the devices, the devices (or units in the devices) must be allocated.

Each DTU, on start-up and after loss of communication, contacts a single device manager to which it sends the properties of its allocatable devices. DTUs also communicate further device status when devices are attached, detached, allocated or released. Further, DTUs may enforce a particular policy as requested by a device manager on behalf of a service. In one embodiment, DTUs may not allocate/de-allocate a device without a device manager.

Desktop unit 112 may be connected to device service 110 via a direct communication path. Device service 110 is controlled by the policy set by device manager 108. Devices/units attached to desktop unit 112 are allocated through device manager 108 to device service 110. Allocation allows device data 134 to be transferred from devices 118 to device service 110. The protocol between device service 110 and desktop unit 112 is bus-specific and is referred to as being "in-band", meaning that operational device data is being exchanged with the device. De-allocation of a device attached to desktop unit 112 may be through the path between device service 110 and desktop unit 112. If desktop unit 112 resets or loses power, for example, all device data may be lost. In this case, the busses may be reset and the connection re-established.

When a new device is connected to desktop unit 112, desktop unit 112 sends a device report 130 to device manager 108 reporting the new device. Device manager 108 sends a device report 126 reporting the new device to device service 110. Device service 110 discovers the new device and makes an allocation request 128 to device manager 108 to allocate the device. Device manager 108 sends an allocation request 132 to desktop unit 112. If desktop unit 112 returns a positive message indicating the device is available, a connection may be established between device service 110 and desktop unit 112 through which device data 134 may be transmitted. Desktop unit 112 reports to device manager 108 of the new ownership of the device. Similarly, when a device changes state (e.g., connected, disconnected, changed owners), a device record including the device's new state is reported by desktop unit 112 to its device manager 108 through device report 130.

Figure 3:
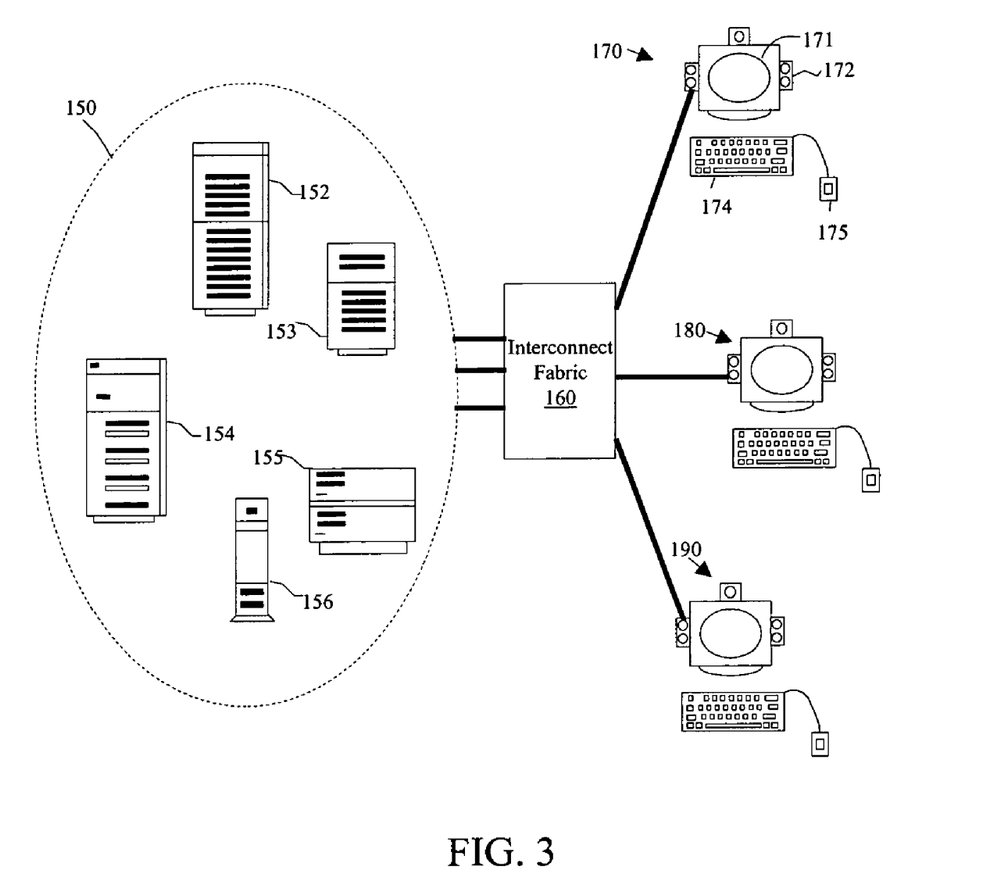
FIG. 3 shows a virtual desktop system architecture.

FIG. 3 illustrates a virtual desktop system architecture in which the conceptual computer architecture shown in FIG. 1 may be implemented. A virtual desktop system partitions functionalities of a computer system between a display and input device (the combination of which is referred to as a human interface device ("HID") or a desktop unit ("DTU")), and data sources or services. The partitioning removes the state and computation functions from the HID (e.g., HID 170, 180, and 190) to the data sources/services 150 run on servers 152 through 156. Data sources/services 150 are not tied to a specific computer or HID, but may be distributed over one or more traditional desktop systems or with traditional servers. For example, one computer may have one or more services, or a service may be implemented by one or more computers. Data sources/services 150 may provide data that comes from sources such as the internet or world wide web. Data sources/services 150 may also be broadcast entities such as those that broadcast television or radio signals.

One or more servers (e.g., servers 152 through 156) may be coupled to one or more HIDs (e.g., HIDs 170, 180 and 190) through an interconnect fabric 160, such as a network. Servers 152 through 156 may be service producing machines such as a proxy for another device providing the computational service (e.g., a database computer in a three-tiered architecture, where the proxy computer might only generate queries and execute user interface code). Another example of servers 152 through 156 include Sun Ray™ servers by Sun Microsystems, Inc. Each server 152 through 156 may be a server machine 100 and each HID 170, 180 or 190 may be a desktop top unit depicted in FIG. 1.

Interconnect fabric 160 may be any suitable communication paths for carrying data between services 150 and HIDs 170, 180 and 190. In one embodiment, interconnect fabric 160 is a local area network implemented as an Ethernet network. Other local network, wide area networks, the internet, the world wide web, and other types of communication path may also be utilized. Internet fabric 160 may be implemented with a physical medium such as a wire or fiber optic cable, or it may be implemented in a wireless environment.

HIDs 170, 180, and 190 are the means by which users access the computational services provided by the servers or services 150. Typically, an HID includes a display, a keyboard, a mouse and audio speakers. For example, HID 170 includes a display 171, a keyboard 174, a mouse 175, and audio speakers 172. In general, an HID, e.g., HID 170, 180, or 190, includes the electronics needed to interface devices (e.g., display, keyboard, mouse and speakers) to interconnect fabric 160 and to transmit data to and receive data from servers/services 150.

Keyboard 174 and mouse 175 introduce user input and communicate that user input with the HID. Other suitable input devices (e.g., scanner, digital camera) may be used in addition to, or in place of, keyboard 174 and mouse 175. Display 171 and audio speakers 172 are output devices. Other suitable output devices (e.g., printer) may be used in addition to, or in place of, display 171 and audio speakers 172.

Figure 4:
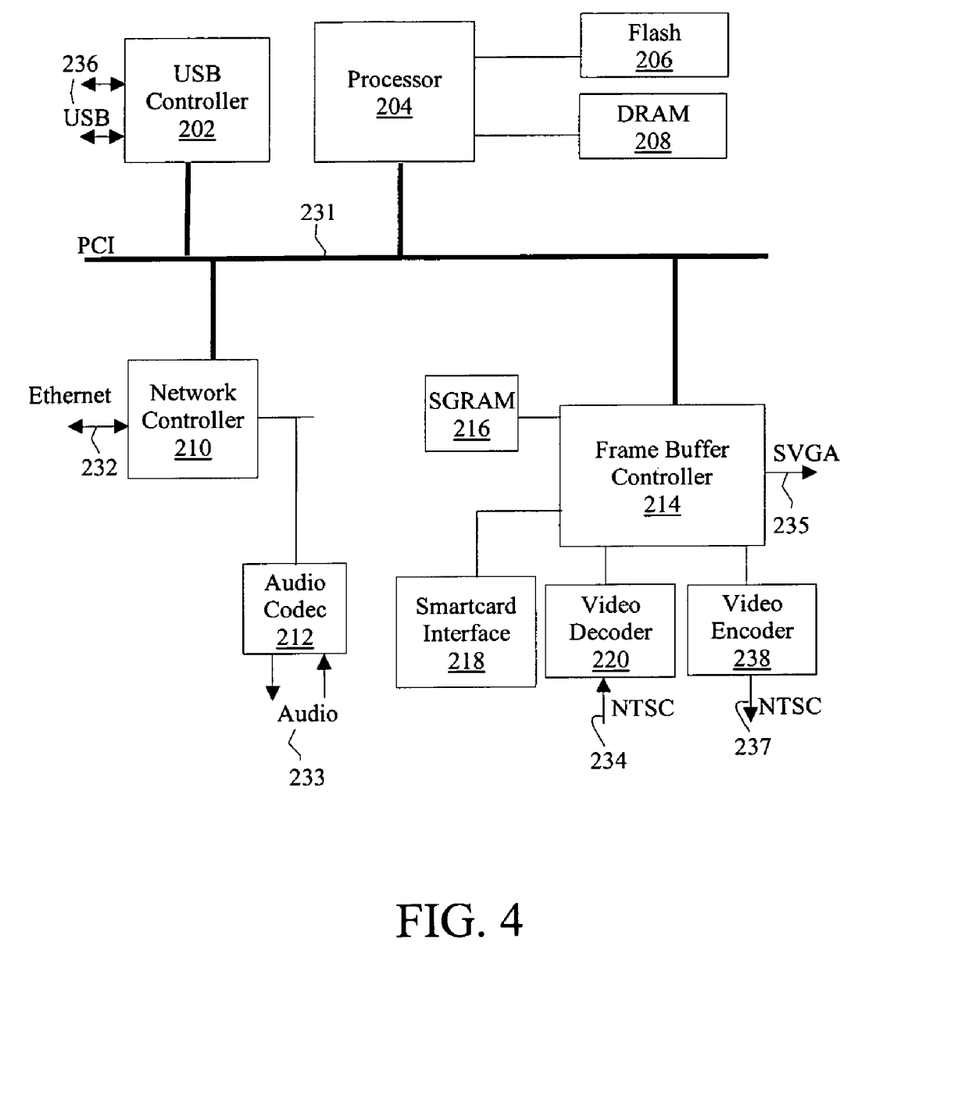
FIG. 4 shows a block diagram of a desktop unit.

FIG. 4 shows a block diagram of the HID illustrated in FIG. 3. Various components of the HID are coupled internally to, e.g., a Peripheral Component Interconnect (PCI) bus 231. A network controller 210 communicates to the interconnect fabric 160 (FIG. 2) such as an ethernet, through line 232. An audio codec 212 coupled to network controller 210 receives audio data on interface 233. Audio codec may be a hardware circuit (chip) or software routine that converts sound into digital code and vice versa. USB (Universal Serial Bus) data communication is provided on lines 236 to a USB controller 202 which is coupled to PCI bus 231.

An embedded processor 204 is coupled to PCI bus 231. Embedded processor 204 may be, for example, a Sparc2ep, which is coupled to a flash memory 206 and a dynamic random access memory (DRAM) 208. In the alternative, processor 204 may be a SPARC™ microprocessor manufactured by Sun Microsystems, Inc., a 680X0 processor manufactured by Motorola, a 80X86 manufactured by Intel, a Pentium processor, or any other suitable microprocessor or microcomputer. A video controller, e.g., frame buffer controller 214, is also coupled to PCI bus 231. Framebuffer controller 214 may be, for example, an ATI RagePro+ frame buffer controller (or any other suitable controller) that provides Super Video Graphics Array (SVGA) output on line 235. National TV Standards Committee (NTSC) or Phase Alternating Line (PAL) data is provided from line 234 into framebuffer controller 214 through a video decoder 220. Similarly, NTSC or PAL data is provided to line 237 from video controller 214 through a video encoder 238. A smart card interface 218 and an Synchronous Graphics Random Access Memory (SGRAM) 216 may also be coupled to framebuffer controller 214.

Alternatively, the HID can be implemented using a single chip that includes necessary processing capabilities and graphic renderer.

Figure 5:
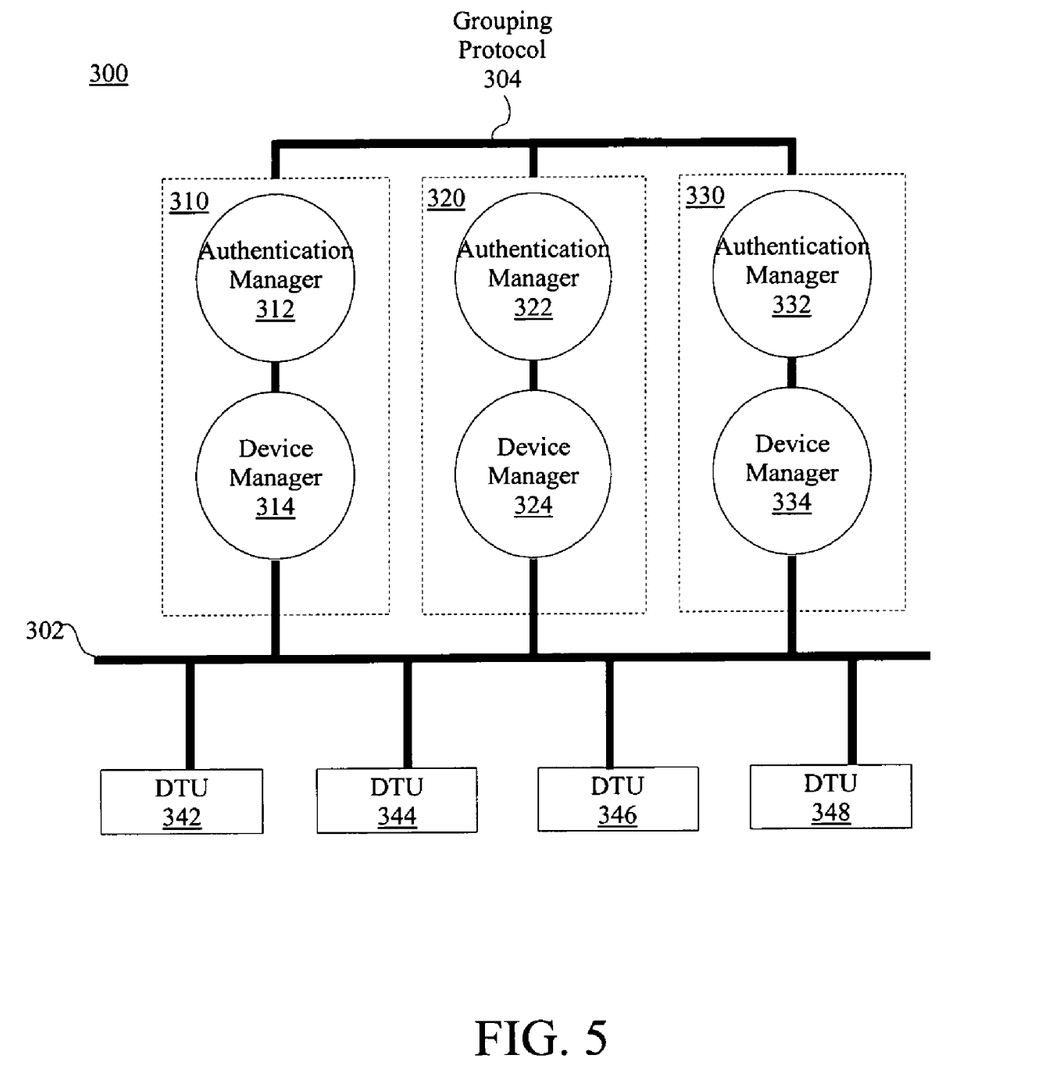
FIG. 5 illustrates a grouped system.

FIG. 5 illustrates a grouped system 300 which includes multiple servers (e.g., server 310, server 320, and server 330) and desktop units (e.g., DTU 342, DTU 344, DTU 346, and DTU 348) coupled to an interconnect bus 302. Each server includes a device manager and an authentication manager. For example, server 310 includes a device manager 314 coupled to an authentication manager 312; server 320 includes a device manager 324 coupled to an authentication manager 322; and server 330 includes a device manager 334 coupled to an authentication manager 332. Servers 310, 320 and 330 communicate to each other through grouping protocol 304.

Grouping protocol 304 includes, but is not limited to, a group list containing grouping information of device managers in a group (what device managers are in a group) and may be defined in any suitable methods (e.g., obtained from a file, user input or a command line). In one embodiment, the group list may be obtained by a device manager from its associated authentication manager or a source that is independent from the device manager. Through grouping protocol 304, each device manager in the group becomes aware of all the other device managers in the group (peers). Each device manager may then contact its peers to establish point-to-point connections between each pair of device managers. For example, device manager 314 in server 310 powers up and contacts device manager 324 and 334 to establish a direct connection between device manager 314 and device manager 324 and a direct connection between device manager 314 and device manager 334. Similarly, device manager 324 in server 320 contacts device manager 314 and device manager 334 to establish direct connection between device managers 324 and 314 and a direct connection between device managers 324 and 334. The connections may be accomplished using any suitable out-of-band connections. Out-of-band connection is a scheme that uses devices that are outside of the primary system to establish connections. For example, the device may use another connection (e.g., authentication manager) or Dynamic Host Configuration protocol (DHCP) to connect to the server. In general, the device may use different connections or protocols to connect to a single server.

Figure 6:
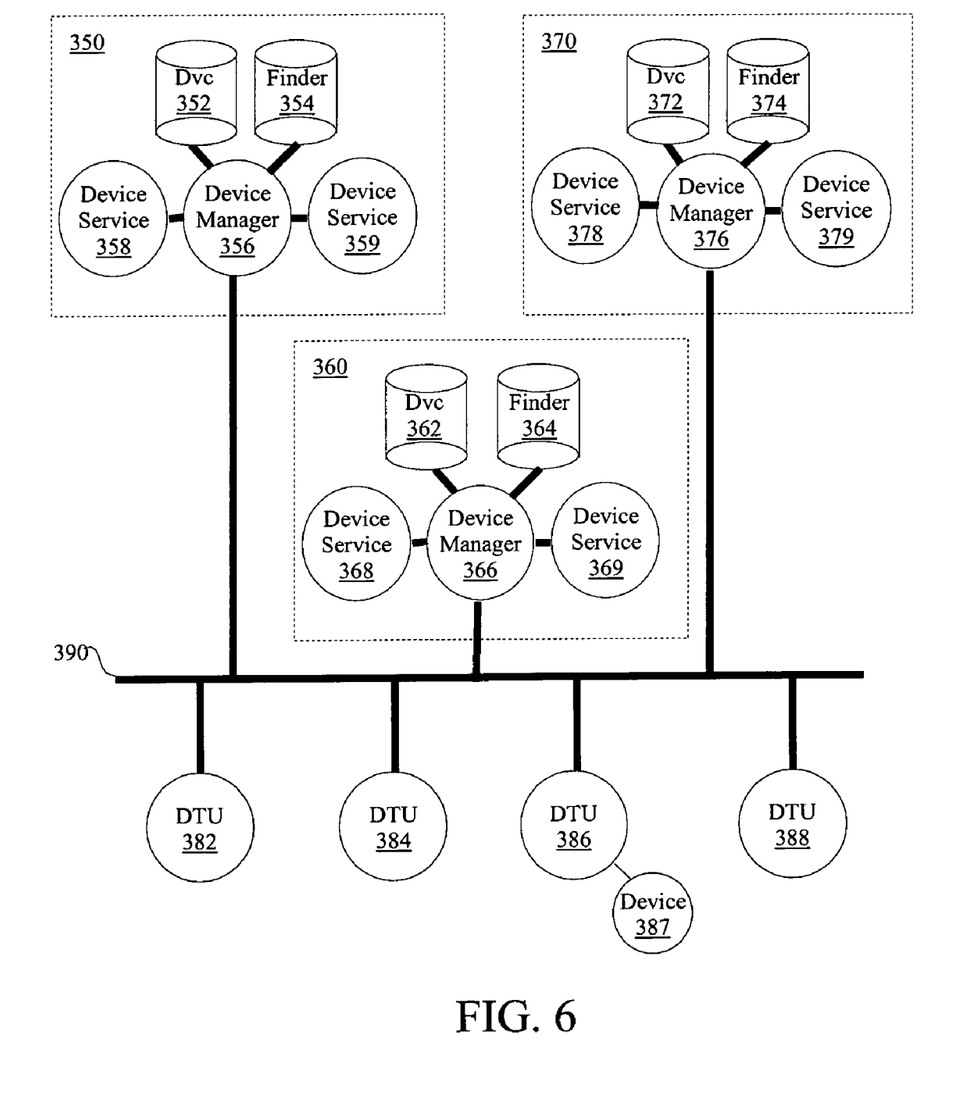
FIG. 6 illustrates an embodiment of a grouped system and its various components.

FIG. 6 shows a grouped system in accordance with an embodiment of the present invention. Server 350, server 360 and server 370 operate as a group. These servers are coupled to DTUs 382, 384, 386 and 388 through an interconnect 390. Server 350 includes a device manager 356 coupled to a device service 358, device service 359, device list 352 and finder 354. Server 360 includes a device manager 366 coupled to a device service 368, device service 369, device list 362 and finder 364. Server 370 includes a device manager 376 coupled to a device service 378, device service 379, device list 372 and finder 374. Various devices may be connected to DTU 382, 384, 386 and 388. For example, a device 387 is coupled to DTU 386.

DTUs 382, 384, 386, 388 are owners of their respective devices and announce the presence and removal of devices and control allocation and de-allocation of each device. In one embodiment, each desktop unit (DTUs 382, 384, 386 and 388) arbitrarily selects and connects to any one of the device managers (device managers 356, 366 and 376). For example, DTUs 382 and 384 may select and connect to device manager 356 in server 350 and DTUs 386 and 388 may select and connect to device manager 366 in server 360. Each DTU can connect to one device manager while each device manager may have multiple DTUs connected to it. Desktop units do not need to be distributed evenly among the device managers because the number of desktop units connected typically does not affect the device manager's performance.

If a service wishes to contact a device on a desktop which is managed by a remote device manager, it contacts its own device manager which is responsible for contacting the remote device manager in turn. The remote device manager is referred to as a "peer". For instance, if DTUs 382 and 384 are connected to device manager 356 and DTUs 386 and DTU 388 are connected to device manager 366 and if device service 358 wishes to contact device 347, device service 358 contacts its own device manager 356 which then contacts remote device manager 366.

Once connected, each device manager creates and maintains a device list. The device list may include a list of devices that are managed by a particular device manager. For example, device list 352 may include devices connected to DTUs 382 and 384; device list 362 may include devices connected to DTUs 386 and 388; and device list 372 may be null. In the alternative, the device list may include a list of devices managed by peer device managers in addition to a list of the devices managed by a local device manager. For example, device lists 352, 362 and 372 may include the same list which includes devices managed by device managers 356, 366 and 376. In yet another embodiment, the device list may include a list of devices managed by all device managers in the group, the device data being distinguished by their owners. For example, device data for devices managed by device manager 356 may be segregated from device data for devices managed by device managers 366 and 367; device data for devices are associated with their respective owners; and so on.

The device list may contain device description records made up of various attributes of individual devices such as, but are not limited to, model, type, function, serial number, session, owner, and bus it is connected to. Device description records may include records describing multi-function devices. Any suitable method may be used to create and maintain the device list, which may be stored in any suitable memory space, including, but is not limited to, a volatile storage, disk or program memory.

When a desktop unit reports a device for the first time, all device data is stored by the device manager that is the owner of the desktop unit. The device manager stores the device data in its device list and in one embodiment, forwards the device data to its peers.

Each device manager in the group also maintains finders on behalf of directly-attached services. A finder is a pattern and contains information with respect to device capabilities of a desired device. For example, finders may specify the type of devices, model of the device, serial number of the device, or other device information. Typically, each device service registers the device it is requesting and the finder is the registered requested information. Finders may be stored in any suitable modifiable storage, disk, program memory, or any volatile storage. If a device listed in a device list matches one of the finders, device data for that device is reported to the requesting service. Device data may be transmitted incrementally.

Finders may be stored in a database and may include all finders for a grouped server system. For example, finders 354, 364 and 374 may include identical finders. In the alternative, finder database may include finders pertaining to device services directly attached to a particular device manager. For example, finder 354 may contain records pertaining to device services 358 and 359; finder 364 may contain finders pertaining to device services 368 and 369; and finder 374 may contain finders pertaining to device services 378 and 379.

Figures 7, 7A:
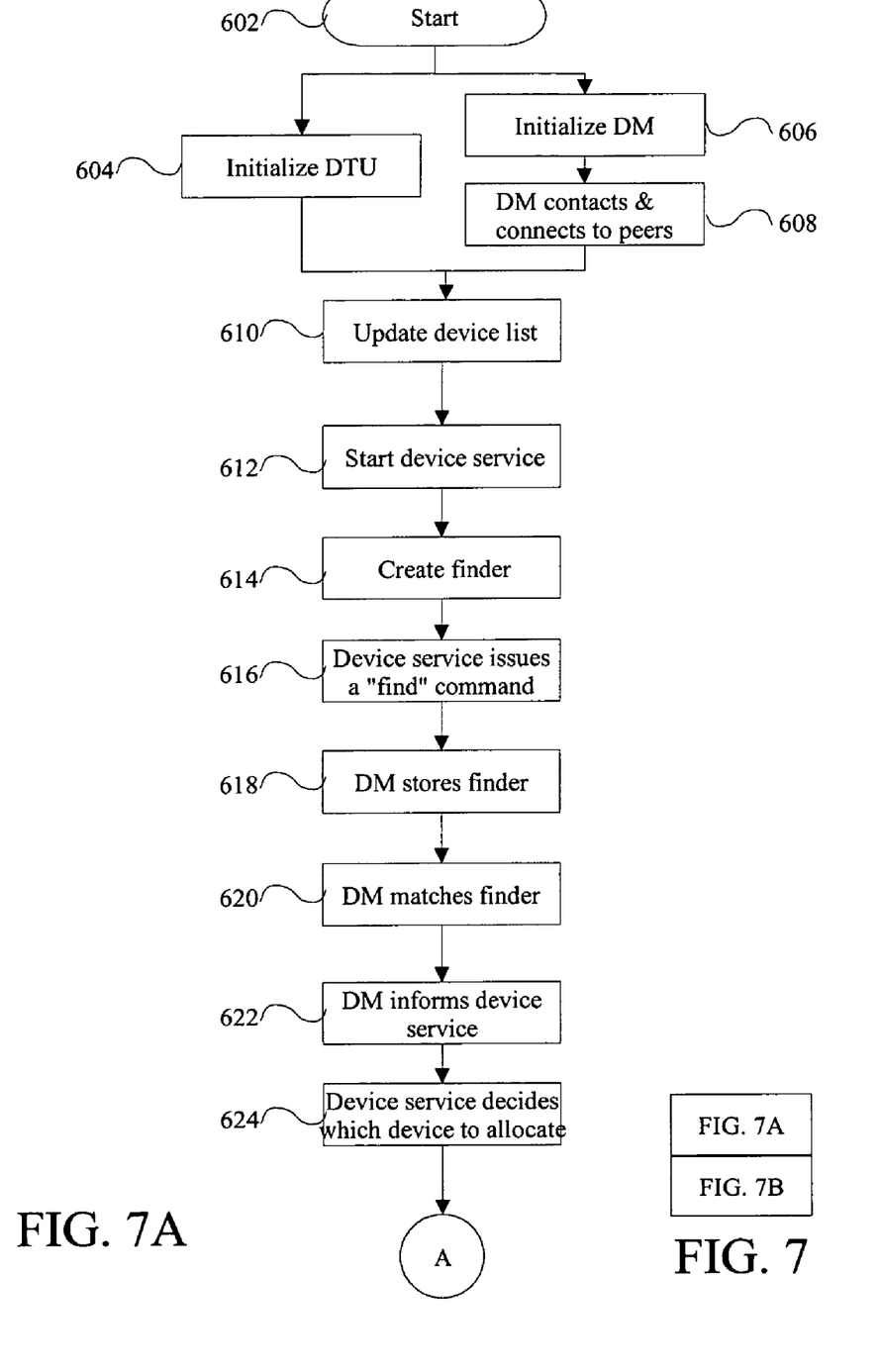

FIG. 7 (FIGS. 7A and 7B) shows a flowchart illustrating operation of the grouped server system shown in FIG. 6. The process starts in step 602. In step 604, desktop units are initialized. Desktop units may be initialized on start-up, on re-establishment of communication after a loss of communication, on command, etc. During initialization, each desktop unit contacts and then connects to a single device manager to which the desktop unit sends the properties of its allocatable devices. The desktop units may select their device managers in an arbitrary fashion. For example, a desktop unit may select the first available device manager it finds or the device manager that owns the least number of desktop units.

In one embodiment, desktop units communicate device status to the appropriate device managers when devices are e.g., attached, detached, allocated or released. For example, if a new device 347 is attached to DTU 386, DTU 386 notifies device manager 356 which then updates device list 352 and communicates this change to other device managers in the group. Similarly, if an existing device is removed from a DTU, the device lists are updated accordingly. In one embodiment, the status changes are cached locally at the local device manager and not at the peer device managers.

In step 606, device managers are initialized. Device managers may initialize upon a server machine power-up, re-establishment of communication after a loss of communication, after a device manager failure, upon a command, etc. During device manager initialization, the device manager first obtains a group list by using any suitable method, e.g., obtained from a file, user input or a command line. In one embodiment, the group list may be obtained from an authentication manager. The group list contains all the group managers in the group, e.g., device manager 356, device manager 366 and device manager 376. In one embodiment, the group list is updated periodically and the device managers periodically update their connections to other device managers in the group.

After obtaining the group list, the device manager searches, contacts and connects to all its peers in step 608. In one embodiment, an initiation protocol is used to establish a trust relationship between the device manager and its peers. The trust relationship enables the local device manager to pass trusted data, such as Unix User Identification (UID), across the network so that the remote device manager can make policy decisions. In one embodiment, the initial trust relationship between the service and the local device manager is established using a local InterProcess Communication (IPC) protocol which is the exchange of data between one program and another either within the same computer or over a network. In general, IPC implies a protocol that guarantees a response to a request. Some examples of IPC protocol are OS/2's Named Pipes, Windows' Dynamic Data Exchange (DDE), Novell's Sequenced Packet Exchange (SPX) and Macintosh's Inter Application Communications (IAC). IPC protocol enables the device manager to determine the nature of the service. A trust relationship may also be established between a desktop unit and its local device manager by using such protocols.

Peer device managers may establish trusted relationship with the local device manager through, e.g., cryoptographic methods. In one embodiment, if the device manager has a lower IP address than the device manager it is contacting, the device manager is the connection "initiator". The initiator sends a cryptographic challenge to the other device manager and expects an appropriate response based on the knowledge of a group key. The device manager being contacted responds with a response message which contains a challenge for the initiating device manager. Other communication does not proceed until the two-way challenge protocol succeeds.

In one embodiment, if the device manager detects that it has a higher IP address than the device manager it is contacting, it sends a message to expedite the discover process by requesting its peer to take the initiator role immediately. Response from the peer may be optional. The device manager, in this case, is referred to as the "listener". Other suitable method may be used to make the connection between device managers. After completion of step 608, connections are established between each pair of device managers listed in the group list.

In step 610, device lists are updated. A device list may need to be updated, for example, on startup, periodically, when a device has been added to a desktop unit, when an existing device fails, when a desktop unit is lost, when a new desktop unit is added, etc. The updates may occur in the local device list but not the remote device lists kept by peers.

A device list may be a cache containing a list of available device capabilities at the desktop unit attached to the device manager. The device list may also contain a list of device capabilities reported by peer device managers. This list may be arranged such that device capabilities for each device manager are segregated or distinguished from each other. For example, desktop unit 384 and desktop unit 386 register their capabilities (e.g., printer, fax, scanner) with device manager 356 which creates a device list 352 containing device capabilities of devices connected to desktop units 384 and 386. In another example, device list 352 contains device capabilities of device managers 356, 366 and 376 and identifying which device capability is provided by which device manager.

In step 612, a device service starts and scopes the device capabilities it needs, e.g., one type of device or multiple types of devices, the interconnect, terminal, session, bus (e.g., PCI bus, ISA bus, USB bus), type of device (e.g., printer, disk, modem), product ID, manufacturer, model ID, revision, serial number, etc. Device service may also identify the type of device it understands, the agency the device service is working for (e.g., a user in a session, system administrator), etc.

From these scoping rules, a finder is created in step 614. Finder may be a simple searching database lookup table or any suitable databases containing the device service's interest on which device it would like to access. In step 616, device service sends an, e.g., open-ended query such as a "find" command to its local device manager. The find command requests the device manager to find a particular device in accordance with the scoping rules listed in the finder. The "find" commend may be a request to, e.g., match a particular terminal, session ID (e.g., hot desking), device function, device, serial number, etc.

The device manager first stores the finder in, e.g., a database under a specified find identification number for that service connection, in step 618. The finder may be stored in any suitable non-volatile memory. In one embodiment, the finder is only stored and run at the local server and not at its peers. In another embodiment, the finders may be passed from the local server to its peers.

In step 620, the device manager evaluates all devices in its device list to find matches for the finder, the searches being scoped based on certain requirements (scoping rules). For example, the searches may be performed on devices on the interconnect or a particular desktop unit or in a particular session. Typically, find commands are evaluated on discovery of devices and the matched devices may be kept in the cache so that the find command need not be re-evaluated every time.

The device manager returns its findings to the device service in step 622. When the device manager finds a match, the device manager sends the device information of the matched device to the appropriate device service. In one embodiment, the local device manager may forward the finder onto its peers whether there is a match locally or not. The peers run their finders against the data, find the device, and return the results.

In one embodiment, if the local device manager does not manage the device requested, the local device manager forwards the finder to its peer(s) and does not store it locally.

In this embodiment, the device manager only keeps the finder for devices that it has direct control. Similarly, if the local device manager manages the requested device, the local device manager saves the finder locally and the peers in the group will never receive the finder.

In step 624, device service decides which device is to be allocated. Device service maintains all device information it receives from local and remote device managers as a result of the match. From these received device information, the device service makes decisions about which device is to be allocated for the requested service. In one embodiment, a service writer waits for all the device/unit information to arrive before selecting which device/unit to use. In one embodiment, the service writer may select the first returned device/unit. In one embodiment, the service writer may select the best match (a match may not be exact). In situations where multiple devices meets the finder requirements, the user may be informed of the list of devices available so he can choose from the list the device he wants. Multiple devices may be allocated. Other selection criteria may be used.

In step 626 (FIG. 7B), device service requests allocation of a selected device. Allocation allows access of a device (as opposed to "owning" a device which enables setting-up the device and setting global parameters). Allocation enables full data flow to and from the device service.

Figure 7B:
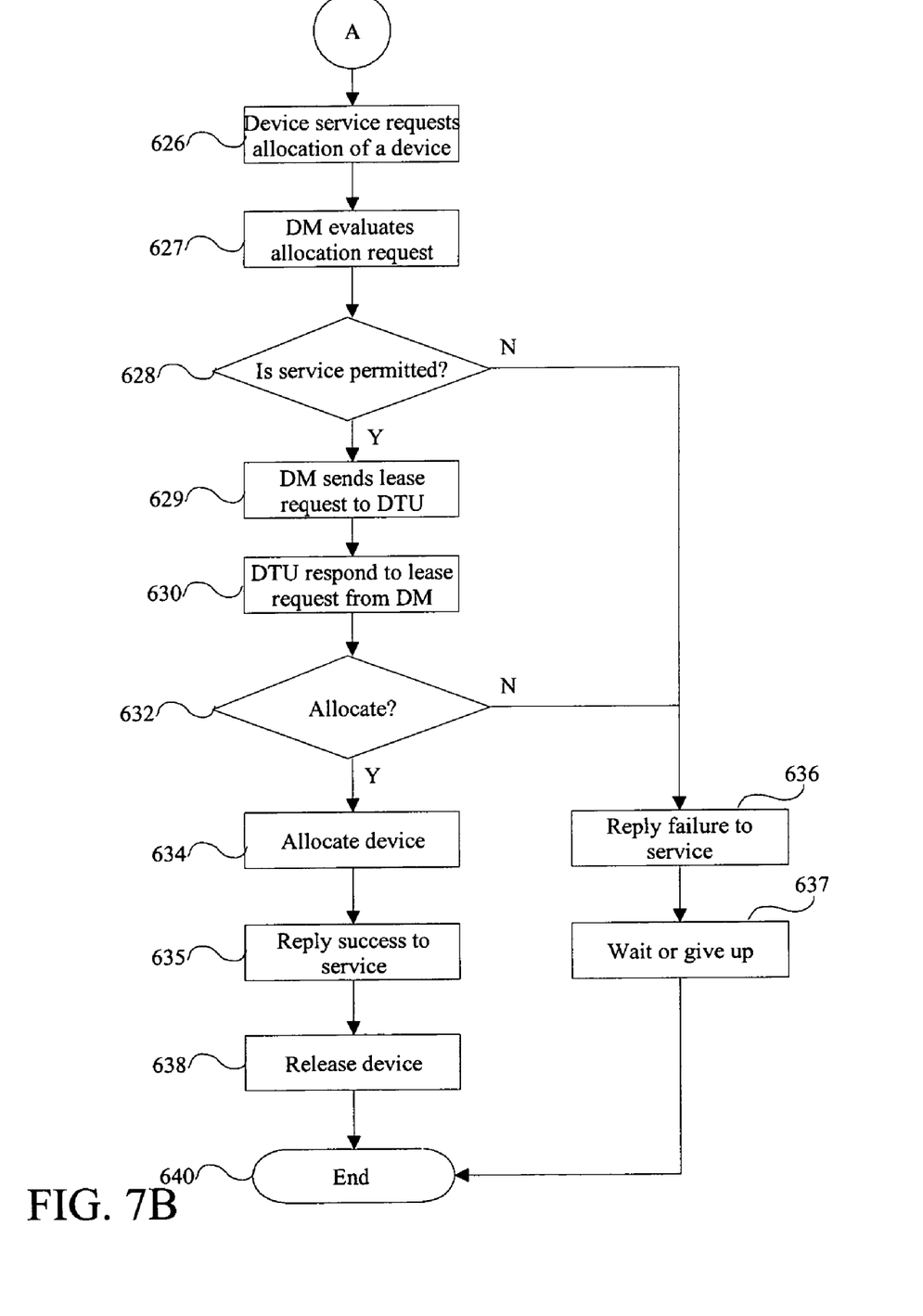

In step 627, the device manager accepts allocation requests from services and interprets the requests. In step 628, the device manager applies a policy to determine if the requested service is permitted. If the service is permitted, the device manager determines a lease value which is sent to the desktop unit in step 629. The desktop unit evaluates the lease request and decides whether to allocate the device. In general, device manager enforces the policy mechanism but the desktop unit has the final right of refusal. In other words, the desktop unit complies with the device manager's evaluation if the device is available and refuses service if the device is unavailable.

The finder may be evaluated against a mostly-static policy database which converts the request, based on e.g., the desktop unit, the device and the device type (called a class), the owner and type of service, and possibly other parameters, into a lease request which is then downloaded to the desktop unit that the device is attached to (step 629). In step 630, the desktop unit responds positively or negatively to the lease request. In one embodiment, the response from the desktop unit is a device or unit update message that indicates the device's current owner which may be the requesting service in the case of a positive response, or a different owner in the case of a negative response.

In one embodiment, if the service is requesting a device on a peer device manager, the request (finder) is forwarded to one of the peers. If the device manager is aware of which device manager is managing the device, the finder is forwarded to the appropriate peer device manager. The peer device manager then evaluate the finder against its device list. In one embodiment, if the service is requesting a device that is being managed locally, the request is evaluated against the local device list.

If service is not permitted (step 628), the resulting device status may be sent to the requesting service in step 636. In general, when a device or unit is allocated or de-allocated, a corresponding device or unit command may be generated by the desktop unit reflecting the ownership changes.

If the desktop unit decides to allocate the device (step 632), the desktop unit allocates the device in step 634. The device manager may then inform its peers of the allocation.

The device manager may optionally reply successfully allocation to the requesting service in step 635. In step 638, the allocated device is either released or de-allocated. In one embodiment, the device may be de-allocated in-band when a service is complete by using e.g., a release command. Desktop units generally have a direct connection to a device service that is controlled by the policy set by the device manager. In one embodiment, where the lease on the device expires, the desktop unit may release the device automatically. The device may also be de-allocated if the device service fails. In one embodiment, the desktop unit de-allocates the device and the device manager un-registers the finder relating to the failed device service. Other ways of de-allocating devices may be utilized. The process ends in step 640.

For a multi-function device divided into units, allocating one unit may cause another unit to become unavailable. In one embodiment, the desktop unit keeps the second device unavailable to prevent the second unit from being allocated. In one embodiment, the desktop unit may report that the second unit is unavailable to the device manager so that other device managers in the group know the unavailability. In one embodiment, for a device requiring device configuration prior to allocation of units, the desktop unit enforces that semantic.

If the desktop unit decides not to allocate the device (step 632), the desktop unit returns a negative message to the device service in step 636. The device service may decide to, e.g., wait for the device to become free (e.g., if the returned message indicates the device does not have an owner); inform the user that the device is unavailable (e.g., via a screen displayed message); queue the request until the device becomes available (e.g., released by another service); or perform other actions (step 637). The process ends in step 640.

Figure 8A:
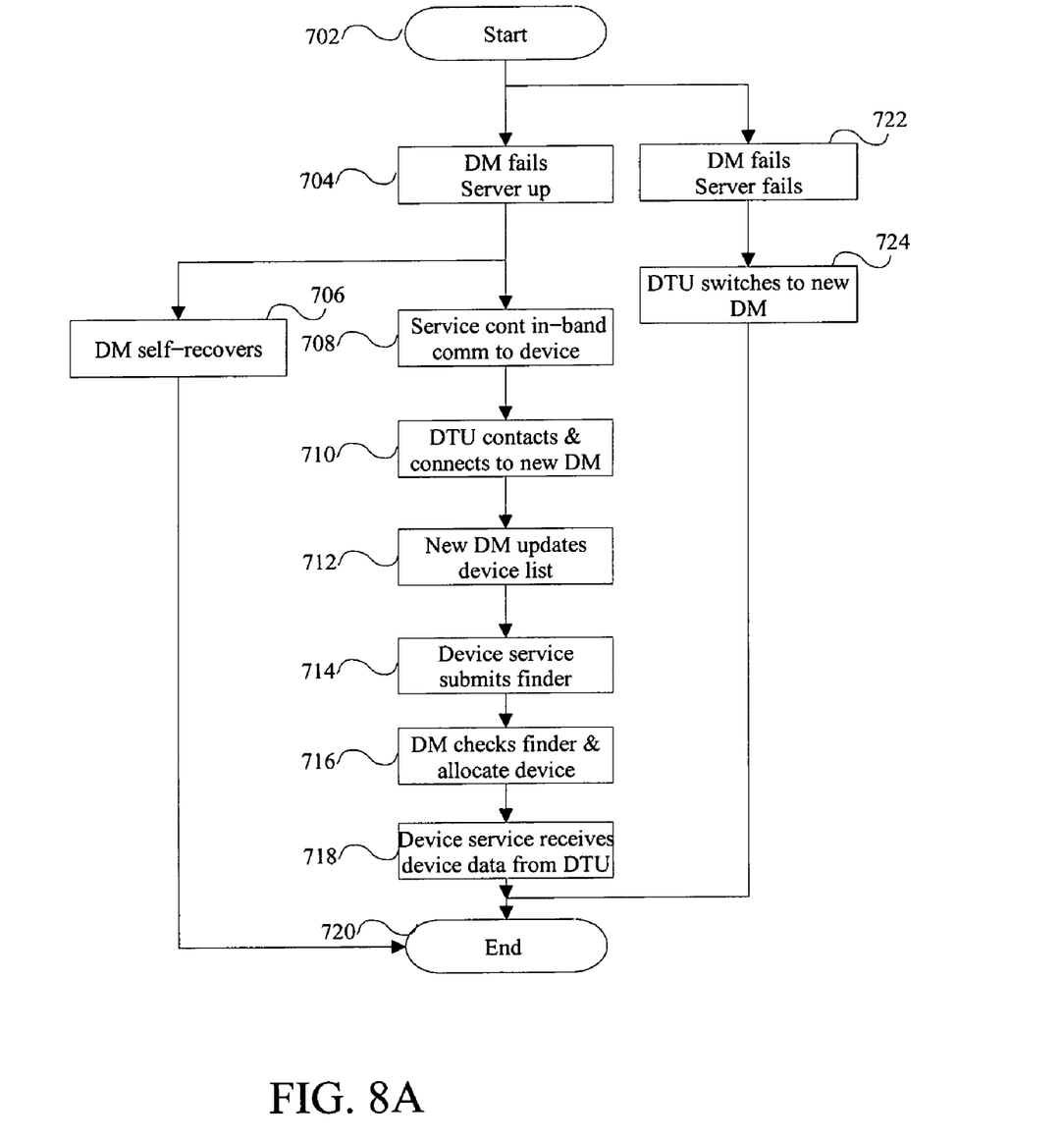
FIG. 8A shows a flowchart illustrating a recovery process when a device manager fails.

FIG. 8A shows a flowchart illustrating a recovery process when a device manager fails. Device manager failure may occur in several ways, e.g., server failure, power off, loss of connection. In general, there are two main scenarios of device manager failure: the device manager fails while the server stays functional and the device manager crashes along with its server.

The process starts in 702. In step 704, device manager fails while the server stays up. The device manager attempts to self-recover in step 706. In the mean time, device service continues device communication through the desktop unit with in-band communication in step 708. The device service will become aware that the device is no longer owned by device manager from the desktop unit through its direct connection. During this time, the device service is typically unable to discover new devices or detect ownership changes in other devices on the interconnect because it is no longer connected to a device manager.

In step 710, the desktop unit that was connected to the failed device manager searches for a new device manager in the group and connects to the new device manager. The new device manager updates its device list by receiving device data from all of its peers and newly connected desktop units in step 712.

Figure 8B:
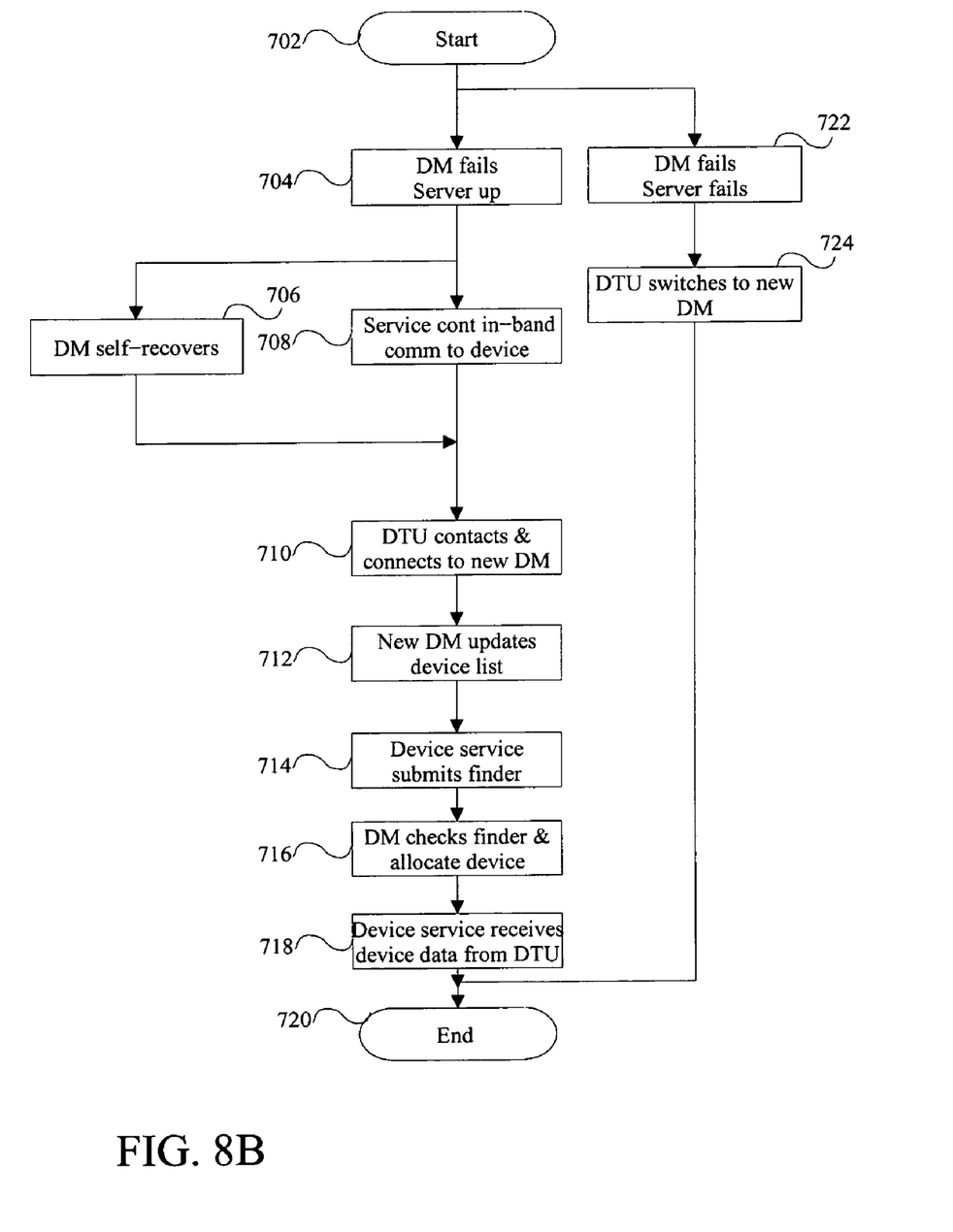
FIG. 8B shows a flowchart illustrating an alternative recovery process.

In one embodiment shown in FIG. 8B, where the failed device manager recovers prior to the desktop unit connecting to a new device manager, the desktop unit may be reconnected to the newly recovered original device manager. The service continues in-band communication to the device during this recovery/reconnection period in step 708.

In step 714, the device service resubmits the finders which are registered with the new device manager (or the recovered original device manager). The new device manager evaluates the finders against the updated device list in step 716 and contacts the desktop unit. The desktop unit returns either a positive or a negative message. If the desktop unit returns a positive message, the device is allocated. The new device manager then notifies other device managers in the group of the device's new ownership. The device service is updated with device data from the desktop unit which is aware of the owners and leases in step 718. The recovery process ends in step 720.

If the device manager crashes with its server, the service is also lost (step 722). When the DTUs connected to the failed server discovers that the device manager is no longer available, the DTUs switch to other device managers in the group in step 724, thus reconnecting with operational services through the new device managers. The recovery process ends in step 720.

To detect failure of a device manager, a heartbeat message may be sent in both directions between the peer device managers and in both directions between each device manager and their respective desktop units. Heartbeat ensures the health of a remote device by periodically checking communication from the remote unit. The heartbeat happens e.g., when a connection is silent in one direction for a certain period of time. After a predetermined number of heartbeat time periods have expired without hearing anything, functionality of the remote unit may be assumed to be non-functional and the connections between the local and the remote units may be closed. For example, device managers which detect a peer as being unresponsive, may close the connection, remove any devices reported by that peer and report those connections to its local services. In one embodiment where a desktop unit fails (e.g., powered off, disconnected), the device data may be removed from the local device list and all peers and all interested device services may be notified that the devices for that desktop unit are no longer available. When the desktop unit recovers with all of its allocations intact, new records may be created and redistributed showing current ownerships.

In an embodiment where recovery is accomplished in less than a heartbeat time period, when the desktop unit recovers, two device managers may "own" the same desktop unit. The scenario may be described as follows with reference to FIG. 6. Device manager 366 owns device 387 when desktop unit 386 fails. If desktop unit 386 recovers within the heartbeat time period, device manager 366 never learned that desktop unit 386 has failed and thus continues to think that it owns device 387. If desktop unit 386 recovers and attaches itself to a different device manager, for example, device manager 376, device manager 376 gains ownership of device 387 through the recovery routine. Device manager 376 therefore also thinks it is the owner of device 387. As a result, both device manager 366 and device manager 376 think that they own device 387.

The ownership conflict may be resolved by time-stamping device records reporting device ownership. In one embodiment, device manager 366 keeps track of when desktop unit 386 was last heard from. If the device record for device 387 stored in its local device list 352 has a time-stamp that is earlier than the time-stamp of the device record sent by device manager 376, the existing device record may be removed and replaced by the new record. On the other hand, if the device record in device list 352 is more recent in time, the incoming command should not be trusted. The time-stamp should be the time when a message is sent rather than when the message is received because the message could have been delayed up to the heartbeat watchdog interval without being detected. The resolution of determining ordering may be based on transmission time.

In one embodiment, a time-stamp system may be implemented with a universal clock. Clock units may be owned by listener peers (those who received the effective connect message) as well as device managers servicing the desktop units directly (who also received connected messages). By having the same units going in both directions, both peers can calculate round trip latency and compensate for drift (if jitter is filtered). The clock may be signed 32-bit integers in seconds from server boot time or implemented using other suitable methods.

Device and unit message may be tagged with a time-stamp on generation at the desktop unit source. Heartbeat messages may be tagged For calibration purposes. Connection messages may be tagged for initial clock calibration.

While the present invention has been described with reference to particular figures and embodiments, it should be understood that the description is for illustration only and should not be taken as limiting the scope of the invention. Many changes and modifications may be made to the invention, by one having ordinary skill in the art, without departing from the spirit and scope of the invention.

We claim:

1. A grouped server system, comprising:
   an interconnect;
   a plurality of servers, each of said servers having a device manager and at least one device driver managed by said device manager;
   a plurality of device services for implementing device drivers located on said servers, said device services capable of being coupled to one of said plurality of severs via the device manager;
   a plurality of desktop units coupled to said servers via the interconnect, each desktop unit being coupled to one of said plurality of severs via the device manager;
   a plurality of peripheral devices located on said desktop units;
   wherein each of the device managers can maintain a first database comprising device data and a second database comprising scoping rules for at least one of said peripheral devices from at least one of said device services;
   wherein each of said device managers can search for a match between said first database and said second database;
   wherein if no match is found between its own first and second database data, each of said device managers operating in a group, can forward a request to other device managers within said grouped server system, thereby brokering control of said peripheral devices;
   wherein said at least one device driver managed by a first device manager, remotely controls at least one of said peripheral devices managed by a second device manager located within said grouped server system; and
   wherein in the event a first server failure is detected, the desktop unit coupled to a first device manager on said failed server will establish a connection with a second device manager on a second server within the grouped server system.

2. The grouped server system of claim 1, wherein each of said device managers is coupled to a device list and wherein said device lists are segregated from each other.

3. The grouped server system of claim 1, wherein each of said device lists comprises data of peripheral devices managed by said device manager coupled to said device list.

4. The grouped server system of claim 3, wherein said device list further comprises data of devices managed by peer device managers coupled to said device list.

5. The grouped server system of claim 2, further comprising a universal time clock for time stamping said device list as it is generated to ensure that said device list coupled to each of said device managers is not outdated.

6. The grouped server system claim 1, further comprising a finder comprising scoping rules for a type of said peripheral devices from at least one of said device services.

7. The grouped server system claim 1, wherein at least one of said device services is coupled to at least one of said device managers, said at least one of said device services communicating a first device report and a first allocation request with said at least one of said device managers.

8. The grouped server system of claim 7, wherein said at least one of said device services is coupled to at least one of said plurality of desktop units, said at least one of said device services communicating device data of at least one said plurality of peripheral devices with said at least one of said plurality of desktop units via said at least one of said device managers.

9. The grouped server system of claim 8, wherein said at least one of the said device managers is coupled to said at least one of said plurality of desktop units, said at least one of said device managers communicating a second device report and a second allocation request with said at least one of said plurality of desktop units.

* * * * *